(12) United States Patent  
Johnson et al.

(10) Patent No.: US 8,291,757 B2
(45) Date of Patent: Oct. 23, 2012

(54) METHOD AND DEVICE FOR DETERMINING WIND CONDITIONS AROUND A SAILBOAT

(75) Inventors: Mark Johnson, Arradon (FR); Chris Hodgson, Ploeren (FR); David Gauthier, Quimper (FR)

(73) Assignee: Raymarine UK Limited, Havant, Hampshire (GB)

( * ) Notice: Subject to any disclaimer, the term of this patent is extended or adjusted under 35 U.S.C. 154(b) by 9 days.

(21) Appl. No.: 13/015,660

(22) Filed: Mar. 4, 2011

(65) Prior Publication Data

US 2011/0192223 A1 Aug. 11, 2011

(51) Int. Cl.
*G01W 1/06* (2006.01)

(52) U.S. Cl. .................................................. 73/170.03
(58) Field of Classification Search .............. 73/170.03
See application file for complete search history.

(56) References Cited

U.S. PATENT DOCUMENTS

| 3,881,094 A | 4/1975 | Taylor et al. ............ 235/150.2 |
| 3,934,129 A * | 1/1976 | Taylor et al. .................. 702/150 |
| 3,968,684 A | 7/1976 | Hafner et al. ............... 73/178 R |
| 4,134,006 A * | 1/1979 | Gordon ..................... 235/61 NV |
| 6,308,649 B1 * | 10/2001 | Gedeon ...................... 114/39.11 |

FOREIGN PATENT DOCUMENTS

WO   WO 2004/099790   11/2004

* cited by examiner

*Primary Examiner* — Andre Allen
(74) *Attorney, Agent, or Firm* — Haynes and Boone, LLP

(57) ABSTRACT

A device and apparatus for determining wind conditions around a sailboat. The device includes means for receiving a measured wind angle and wind speed readings from a wind sensor attached to the sailboat and readings of boat heading and boat speed through the water, means for storing wind angle correction data, a computing unit for computing a corrected wind angle reading using the measured wind angle reading, the boat speed reading and the wind angle correction data and for computing a wind direction using the corrected wind angle reading and the boat heading reading, and means for displaying the wind direction. The device additionally includes input means for receiving a wind direction error tack to tack, means for determining the current tack state of the sailboat using the measured wind angle reading, and means for modifying the correction data. Thus, powerful and intuitive correction of wind direction readings is possible.

20 Claims, 6 Drawing Sheets

US 8,291,757 B2

METHOD AND DEVICE FOR DETERMINING WIND CONDITIONS AROUND A SAILBOAT

FIELD OF THE INVENTION

The invention relates to correction of wind condition measurements during sailing. In particular, the invention relates to a device and method for calculating the true wind direction.

BACKGROUND OF THE INVENTION

The airflow across the sail of a sailboat is complex, and when measuring the apparent wind speed and direction using a masthead sensor, the measurement point is in disturbed air (upwash). The current state of the art is to raise the point of measurement using a "vertical" pole. This places the measurement point typically 1.3 m above the mast head, but the airflow disturbance (accelerated, turned air) is still significant, even at this height. The measurement errors, even when using a vertical pole, are typically 15% in terms of airspeed, and 7 degrees in terms of wind angle measurement which is doubled to 14 degrees when computing a wind direction (the same error compounds tack to tack). The change in the measured wind direction due to tacking is sometimes referred to as "wiggling".

Three main sources of errors making the measurement of wind direction and/or speed more difficult are identifiable.

FIG. 1 shows schematically the wind behaviour around a sail 1 of a boat 4 as wind field lines 3. The wind measurement point 2 is typically located in front of the sail 1, in upwash. This results in error that is frequently called "upwash error".

FIG. 2 shows an exemplary graph of the magnitude of the error in apparent wind angle (AWA) for a plurality of wind speeds. It can be seen that the error is at its maximum when the boat is heading in oblique direction with respect to the wind. This is the source of a so called "heel error".

Furthermore, leeway creates a measurement airflow disturbance which is in the opposite sense to the airflow error. In addition, heel creates geometrical reading errors as follows (horizontal axis is apparent wind angle, vertical axis is wind speed in knots). Leeway is the angle of attack of the keel—a sideways slip is needed for the keel to create a windward lifting force. The "leeway error" is illustrated in FIG. 3 in which line A1 represents the true wind direction, A2 represents boat speed, A3 the leeway error, A4 the apparent wind speed and A5 an imaginary apparent wind direction if leeway effect did not exist.

In summary, the wind angle and speed measured by a masthead wind unit is subject to error caused by aerodynamic effects on the sails, and by heel & leeway which affect the measurement geometry of the system. The size of the error is variable, it depends on many factors: the boat characteristics, wind speed, wind angle, air temperature, humidity, etc. If not corrected, these errors give rise to problems when sailing, typically a false shift in the wind direction reading when tacking or jibing and a false change in the wind speed reading when changing from an upwind to a downwind course.

Traditionally these errors have been corrected by a complex and time consuming calibration process. The existing art attempts to compensate for these errors typically takes the form of a user defined correction tables. The tables typically include separate correction values for upwind, reaching, and downwind wind angles and/or speeds and for different true wind speeds. The problem is that the correction table is complex for a user to understand and optimize, therefore most users fail to enter or manage the correction. Furthermore, each boat has its unique variant of the above table; therefore a standard table is not supplied or not applicable. Thus, in order for the table-based correction to be possible, the boat or sail manufacturer must provide the correction data in exactly the right format for the monitoring device used or the user must perform his/her own calibration tests, which is a very demanding task. This leaves most users in a position where their displayed wind direction can change by 14 degrees when they tack the boat, and the displayed wind speed can appear to accelerate by 10% when they go from upwind to downwind.

Another approach to correction is to use a mathematical formula to model the causes/effects and ask the user to fine tune the parameters. These correction methods are, however, complex for a user to understand and adjust, therefore most users fail to enter, manage or apply corrections, and have to live with sizable measurement errors in spite of having sophisticated instrument systems on board. Furthermore, each boat has its unique variant of the above table; therefore a standard table is not supplied or is not applicable. This leaves most users in a position where their displayed wind direction can change by 14 degrees when they tack the boat, and the displayed wind speed can appear to accelerate by 10% when they go from upwind to downwind. For example Ockam Instruments and Brookes and Gatehouse provide commercial devices in which the above correction principles are applied.

Yet another approach is disclosed in WO 2004/99790, relating to a system adapted to determine the air flow conditions around one or more sails being equipped with a number of ultrasonic sensors that are distributed over both surfaces thereof. The ultrasonic sensors communicate the flow conditions in their vicinity to a central unit. However, the system requires a lot of instrumentation and is thus difficult and expensive to install.

Thus, improved wind speed and angle monitoring devices and methods are needed.

SUMMARY OF THE INVENTION

It is an aim of the invention to provide a simpler device and method for improving the accuracy of wind measurements. The aim is achieved by the device and method disclosed herein.

The device comprises means for receiving a measured wind angle reading and wind speed reading from a wind sensor attached to a sailboat, means for receiving boat heading and speed readings as the boat travels through the water and means for storing wind angle correction data. In addition, the device comprises a computing unit for computing a corrected wind angle reading using the measured wind angle reading, the boat speed reading and the wind angle correction data and for computing a wind direction using the corrected wind angle reading and the boat heading reading and means for displaying or outputting the computed wind direction. According to the invention, the device comprises input means for receiving a wind direction error tack to tack from the user or means for automatically determining this error, means for determining the current tack state of the sailboat using the measured wind angle reading, and means for modifying said wind angle correction data based on said wind direction error and said current tack state information.

The wind direction error is a sailboat-specific correction parameter which can be determined by the user during sailing by observing the wind direction readings while tacking, as will be explained later in more detail.

In a typical embodiment, the device is adapted to receive a plurality of wind direction errors corresponding to different tacking conditions, i.e. sailing directions (upwind/downwind) and/or wind speeds, and to automatically utilize these errors for modifying the wind angle correction data.

The invention offers several advantages. The main advantage of the invention is that the only correction parameters required can be experimentally easily found out by tacking. This is because the wind direction error observed when tacking can be directly used as a correction parameter. The invention removes the need of the user to bother about the implementation (e.g. magnitude, direction, applying in different wind/tack situations) of the correction: he or she may just enter the wind angle deviation observed to the device, preferably in signed degree format, and the device takes care of applying the required modifications to the correction data so that subsequent corrections will be more accurate. Practical algorithms for this are explained in the detailed description and drawings.

The invention takes into account airflow, heeling and leeway errors in a simple and intuitive manner by taking advantage of the wind direction error(s) observed. That is, the three main sources of error are all combined into a single correction parameter, which can be easily determined.

The wind direction error value input by the user may simply and intuitively be the amount of deviation of the wind angle reading observed when tacking and it is used for fine-tuning the initial correction data to take into account individual boat characteristics. In practice this means that the device takes care of applying the modification to the wind angle correction data, and of calculating and showing a calibrated, more truthful wind direction information from there on, without bothering the user with tack issues.

A single device, comprising one initial correction data set, can cover practically all single-mast sailboats used in amateur and sports sailing. However, the principle of the invention can be applied for larger sailboats too.

To summarize, the invention provides sophisticated built-in corrections that dramatically reduce wind-related errors for the majority of boats. Due to the invention, an intuitive one step process to immediately enter a fine tuning adjustment whenever an error is noticed, is possible.

The wind direction error can be obtained from the user who is monitoring a wind direction display which is at the device or functionally connected to it. As mentioned above the error may directly correspond to the change in a measured wind direction from tack to tack, revealing the need for calibration of the device. For example, if the wind direction is seen to be ten degrees high on the current tack upwind, the user can enter a ten degree negative adjustment in an upwind angle setup page of the user interface of the device.

The device also comprises means for receiving a real-time measured wind speed reading in addition to the real-time wind angle reading. The computing unit may be adapted to automatically apply a required correction to a wind speed or wind speed range of the wind angle correction data corresponding to the measured wind speed at the time of entering the correction value. Thus, real-time corrections may be very easily made should the sailor for example observe that at particular wind speed range, the wind angle reading is varying depending on the tack state. A practical implementation of this utilizes a piecewise linear correction function, as will be explained later in more detail.

The device is preferably adapted to correct the wind speed reading too. This can be implemented using the same intuitive principle as described above with respect to wind direction correction by receiving from the user or to automatically determining a wind speed error observed when changing from upwind to downwind, determining whether the boat is sailing upwind or downwind, and correcting the measured wind speed reading using said wind speed error and information on the sailing direction for obtaining a corrected wind speed reading.

According to a preferred embodiment, the wind direction error is requested from the user in degree format, preferably signed degree format. In a preferred embodiment, the wind direction error is divided by two for allowing the user to directly input the magnitude and direction of wind angle deviation observed during tacking as the wind direction error (as the error compounds tack to tack).

According to one embodiment, the device comprises user interface means for receiving the wind direction error, the user interface means preferably being usable during sailing such that immediate corrections can be made during sailing based on tacking experiments. The user interface means preferably comprises a display, input means, such as one or more keys, and a computer program adapted to query correction values from the user.

According to one embodiment, the device is adapted to utilize separate wind direction errors for upwind and downwind sailing angles, as the wind conditions at a masthead sensor are dramatically different in these situations. The computing unit is adapted to apply corresponding upwind or downwind angle corrections to the wind angle correction data, which preferably comprises separate tables or functions for upwind and downwind angle corrections. The detection of the orientation of the boat with respect to wind direction can be automatically detected, whereby the user need not be bothered with this issue either. Alternatively, the user may input this information to the device.

A further aspect of the invention concerns the initial wind angle correction data which forms the basis for computing a correct wind direction. It was surprisingly found by the inventors that despite the very unpredictable, even chaotic, behaviour of airflow around the sails of sailboats it would be possible to generate a common initial correction dataset applicable to practically all sailboats. This initial correction dataset can be modified, using only the wind direction errors tack to tack for obtaining the correct true wind angle and further the true wind direction. Thus, whilst the traditional correction tables do vary from boat to boat, statistical analysis of the variations indicates that they can be used to generate the initial correction data. Adequate correction can then be applied in a simple and mathematically un-heavy way, for example using the algorithms discussed in more detail later in this document.

In a typical embodiment, two to five, and preferably three, upwind and downwind adjustments at different wind conditions (e.g. low, medium and strong wind) are requested from the user to fully calibrate the system.

This invention will become more fully understood from the following detailed description, taken in conjunction with the accompanying drawings described herein below, and wherein like reference numerals refer to like parts.

DETAILED DESCRIPTION OF THE PREFERRED EMBODIMENTS

Definitions

TWD: True wind direction (typically ranging clockwise from 0 to 360 degrees, 0 means wind from north).

AWA: Apparent wind angle (typically ranging clockwise from −180 to 180 degrees, measured (uncorrected) angle between boat centreline and incoming wind).

TWA: True wind angle (typically ranging clockwise from −180 to 180 degrees, true (corrected) angle between boat centerline and incoming wind).

AWS: Apparent wind speed (measured and uncorrected wind speed, typically in knots).

TWS: True wind speed (corrected wind speed, typically in knots).

Tack state: Orientation of the boat with respect to wind direction (port or starboard tack).

Figure 1:
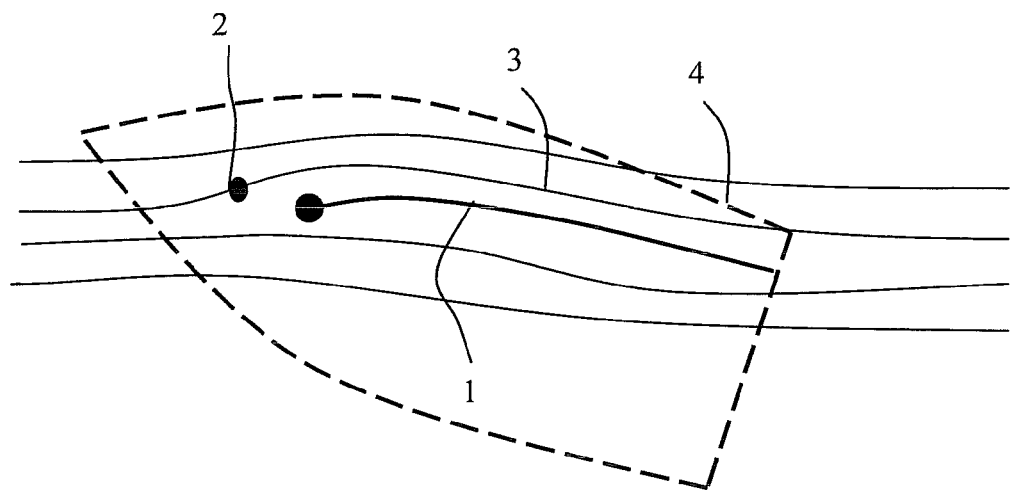
FIG. 1 shows schematically a sail and a disturbed air slow around it (airflow error).
Figure 2:
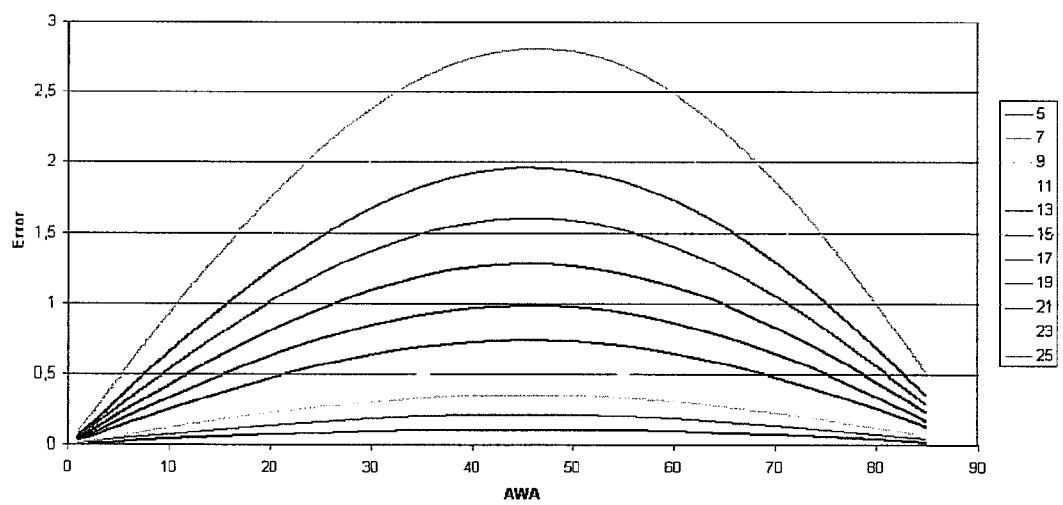
FIG. 2 shows the error in wind angle measurement as a function of apparent wind angle (AWA) for a plurality of wind speeds (heel error).
Figure 3:
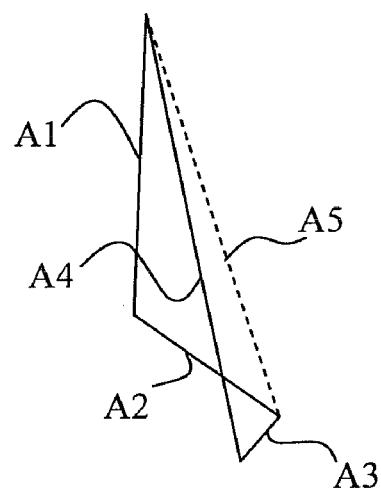
FIG. 3 schematically illustrates the error resulting from the angle of attack of the keel (leeway error).
Figure 4:
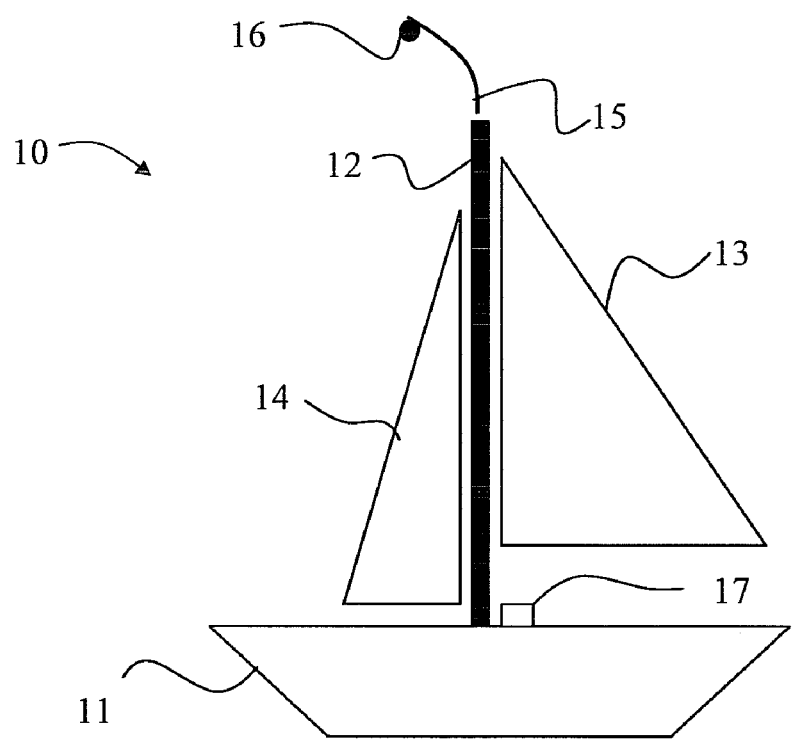
FIG. 4 shows a side view of a boat having a device according to a preferred embodiment of the present invention.

With reference first to FIG. 4, an exemplary sailboat 10 comprises a body 11, mast 12 vertically attached to the body 11, a mainsail 13 attached to the rear side of the mast 12 and a headsail 14 attached to the front side of the mast 12. The wind conditions are measured using a masthead wind sensor 16, which is arranged to a pole 15 extending from the mast 12. The wind sensor 16 is functionally connected by wired or wireless communications channel to a wind monitoring device 17, which is arranged such that it can be viewed by the sailor(s). Wind sensors designed for onboard use are commercially available from a plurality of manufacturers.

Figure 5:
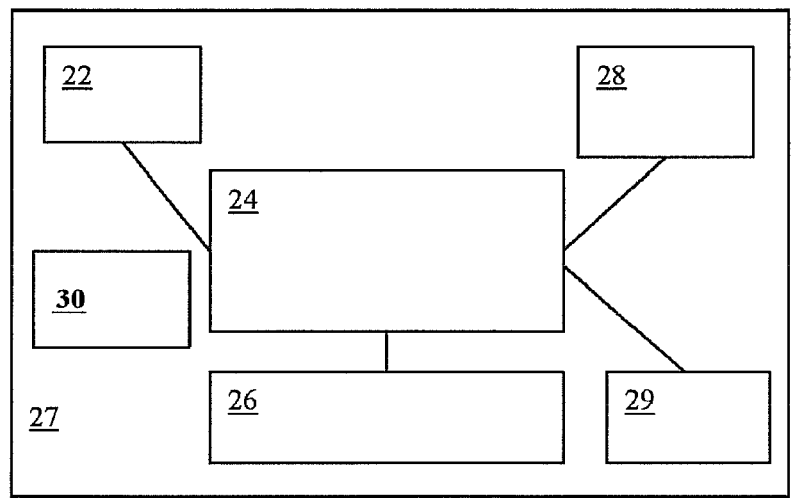
FIG. 5 shows block diagram of a device according to one preferred embodiment of the present invention.

FIG. 5 shows a simplified block diagram of a wind monitoring device 27 according to one preferred embodiment of the present invention. The device comprises a main computing unit 24, such as a microprocessor, and, connected to the computing unit 24 a storage unit 26, which may be a solid state memory chip, for example. The device 27 also comprises input unit 22 for receiving a wind signal or reading from an external wind sensor. In the case of wired connection, the input unit 22 may comprise a connector and, optionally, means for transforming the input signal or reading into desired digital format suitable for the computing unit 24 to process, such as, for example, an analog to digital converter. The input unit 22 also can comprise means for receiving boat speed and heading signals or readings from respective sensors. In case of a wireless connection, the input unit 22 can comprise an antenna and radio unit adapted to receive wireless wind condition data signals from the sensors. In addition, the device 22 can comprise an output unit 28, which is capable of providing at least one reading, typically at least the true wind direction reading and true wind speed reading, processed by the computing unit 24 to a sailor. According to one embodiment, the output unit 28 comprises a display 30 operably coupled to the wind monitor device 27. According to another preferred embodiment, the output unit 28 can comprise a connector for external wired display or wireless transfer means for providing wind reading data to an external wireless display. In addition, the device 27 preferably comprises user input means 29 for receiving wind direction error values or other data or commands from the user.

As is apparent from the discussion above, the wind conditions measured by the wind sensor are the wind speed and wind angle. These quantities, i.e. the AWS and AWA readings, are corrected for taking into account the boat speed through the water and other measurement errors, such as the upwash, leeway and heel errors in order to obtain TWS and TWA readings. The TWA is further converted to TWD by taking into account the heading of the boat.

In practice, the storage unit of the wind monitoring device may comprise several data areas for storing the initial and boat-specific (modified) correction data. At least the boat-specific correction data areas are preferably re-writable.

In a typical embodiment, a plurality of wind direction errors at different wind speeds and boat orientations with respect to the wind are required to fully calibrate the system. For both upwind and downwind orientations, for example 2-5 error values may be requested, corresponding to different wind speeds or speed regions. The correction parameters are preferably in the form of signed (i.e. positive or negative) wind direction errors, the sign of which, in addition to the current tack state, determine the direction of modification of the initial correction data.

According to one preferred embodiment, the initial correction data can comprise at least one discrete, piecewise linear or continuous correction curve, indicating the value of correction as a function of measured wind speed.

According to another preferred embodiment, the initial correction data comprises at least two, preferably three, initial correction values for three different wind speed values (e.g. 5, 15 and 25 knots) subsets are in the form of discrete arrays indicating the required correction of wind angle for a plurality of measured wind speeds. The correction values define a piecewise linear initial correction curve. Storage of such arrays in a machine-readable format on a memory unit can be implemented by any technique known per se.

The number of initial correction values for the piecewise linear correction curve can be also more than three, for example 4-100. However, the inventors have found that three values are sufficient to appropriately model a generic correction curve, which is suitable for most sailboats and by limiting the number of values to three, also the amount of boat-specific data values required from the user (or automatic calibration algorithm) remains reasonable.

According to another embodiment, the initial correction data is in the form of one or more continuous mathematical functions, from which the required correction can be calculated using the measured wind speed as a starting value. Thus, the initial data defines a correction for each measured wind speed. This initial correction function is modified based on a limited number (preferably 3 per tack at maximum) of boat-specific correction values.

Figure 6:
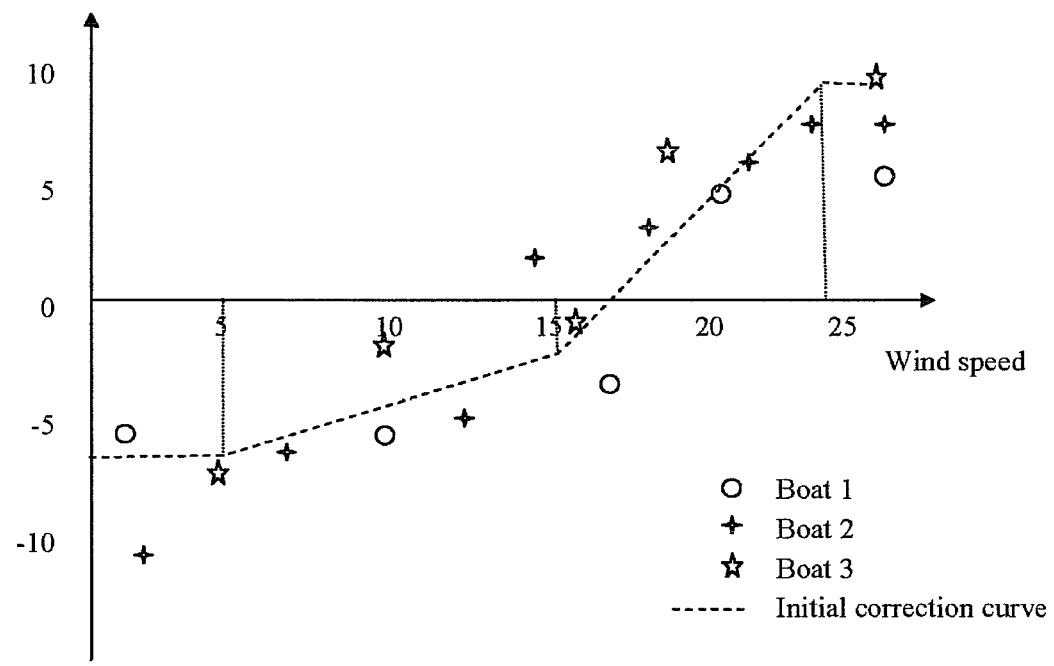
FIG. 6 shows the principle of generating the initial correction curve according to one preferred embodiment of the present invention.

FIG. 6 shows graphically the formation of an initial wind angle correction function using the correction data of three sailboats whose air disturbance properties are known (e.g. by measurements or simulations). Based on the discrete data, a piecewise linear correction function, more specifically, the points of discontinuation thereof, are determined. At its simplest form, this occurs by averaging the discrete data and fitting the piecewise linear correction function to the averaged data, using predefined points of discontinuation (e.g. at wind speeds 5, 15 and 25 knots). Preferably, the initial correction function is formed using the data of more than three sailboats in order to make a more general initial correction function. As the correction data available for individual sails is typically limited and discrete by nature, the averaged data may be formed using extrapolated and/or interpolated data obtained by mathematical curve fitting algorithms.

Thus, according to a preferred embodiment, the initial correction data comprises correction data which is statistically formed from the sail disturbance data for a plurality of individual sails such that the data relatively well represents a plurality of boats. The initial data is therefore a probabilistic "guess" of the correction required for a boat. FIG. 6 shows an exemplary correction curve (corresponding to one correction data subset), which is obtained as an average of the correction data of three individual boats. In practice, the curve can be obtained by a curve fitting algorithm using the individual correction points as starting values.

Figure 7:
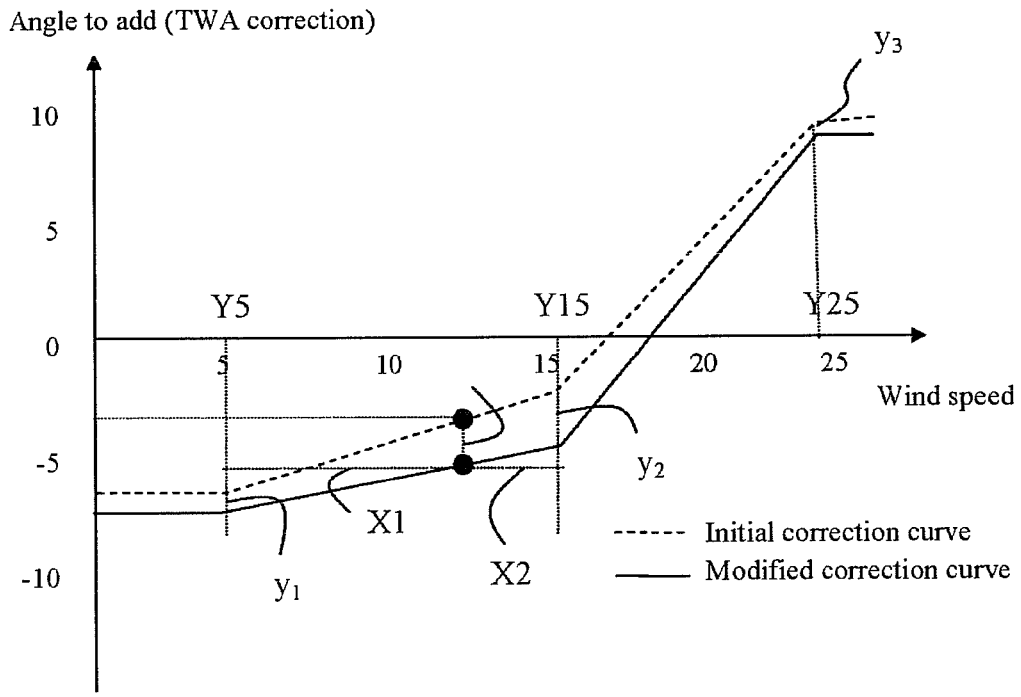
FIG. 7 illustrates the principle of calculating a modified correction curve and corrected wind angle reading according to one preferred embodiment of the present invention.

FIG. 7 illustrates graphically the modification of the initial correction data using the wind direction error received from the user or automatically determined. The dashed line represents the initial correction data and its determination is discussed in more detail above. The solid line represents the modified, i.e. fine-tuned, data. In order to form the latter data, the parameters $y_1$, $y_2$ and $y_3$ based on the wind direction error values (directly received from the user or calculated based on adjustment values at other points of the curve, see also below) are subtracted from the key points (Y5, Y15 and Y25) of the former data. Thus, a new piecewise linear function is obtained. Thus, for each wind speed, a slightly modified wind angle correction is obtained. Provided that the wind direction error values are correct, applying the modified wind angle correction to the measured wind angle yields the true wind angle (TWA) and further the true wind direction.

From the modified correction function, the required correction at each wind speed (not just 5, 15 and 25 knots) can be determined by geometrical analysis.

It should be noted that the values and curves shown in FIGS. 6 and 7 only illustrate the principle of the invention and are not necessarily of the right magnitude or based on true data.

Figure 9:
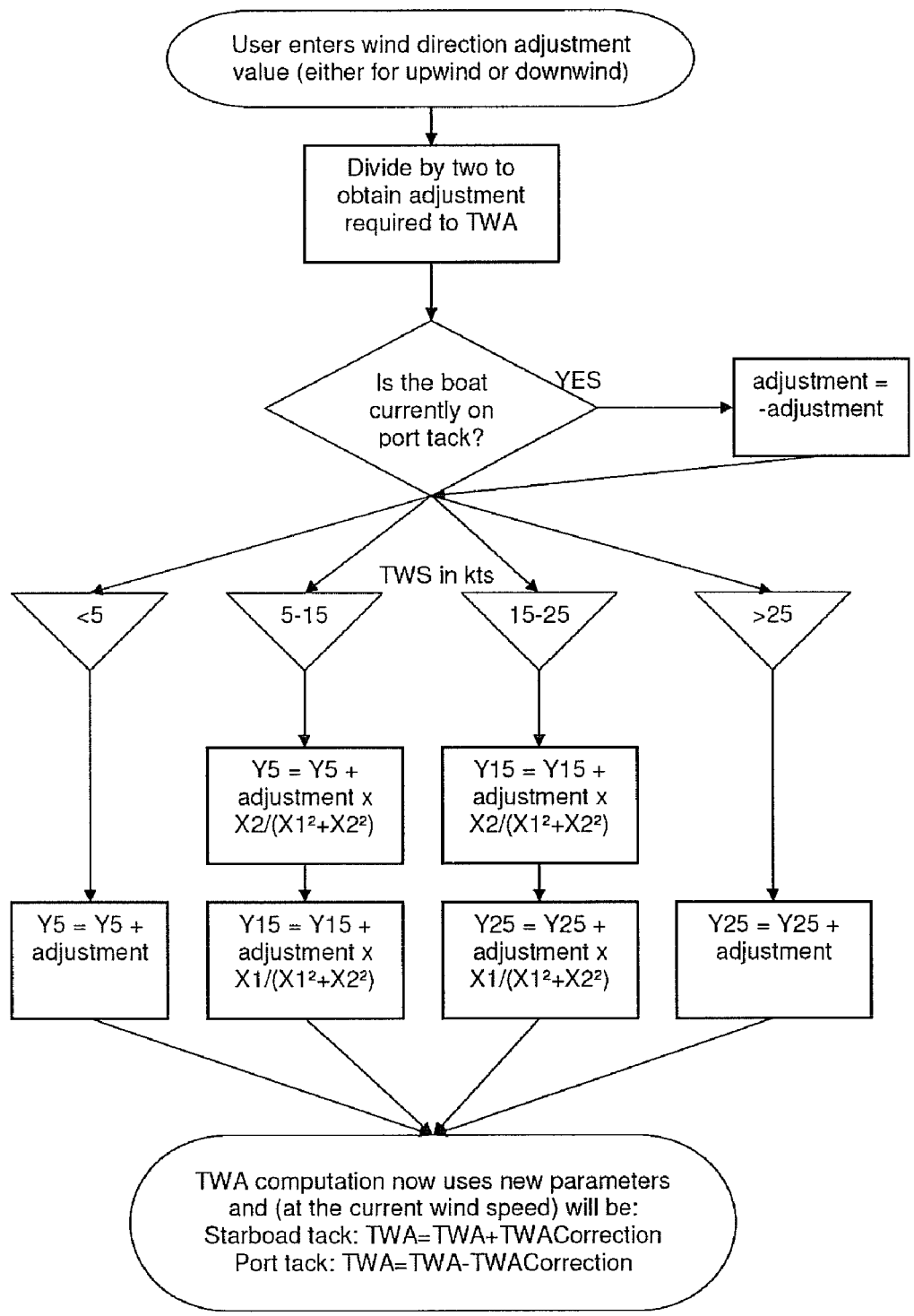
FIG. 9 shows a wind angle correction algorithm as a flow chart according to one preferred embodiment of the present invention.

FIG. 9 shows the correction algorithm in more detail as a flow chart. The essential step of determining the tack of the boat, and its effect on the sign of the modification (adjustment), is shown as diamond shape. Depending on this determination, the sign of modification of the wind angle correction data is affected without any input from the user. When the user notices a tack to tack TWD error, this is divided by two and applied to the TWA correction table based on the current TWS according to the process of FIG. 9, for example. Also the steps of calculating the TWA are shown, including the mathematical functions for calculating the modified key points based on current TWS point (with reference to the coordinate denotations of FIG. 7), i.e. the wind speed at which the calibration tack-to-tack measurement is carried out.

The approach for fine tuning developed here is to let the user tell the correction software what he or she sees at the moment in a simple way, and to hide the complexity of how to adjust and manage the tables. The device, for its part, makes adjustments based on what it "sees" at the moment, i.e. the tack state and wind speed. This eliminates the need of the user to understand the sign of the change, which may be difficult (because depending on the tack, a wind direction that reads high means either that the apparent wind angle (AWA) is too low or too high). Another aspect which is difficult in prior art is the recording of the wind speeds at which each data point is taken and then fitting this recorded data to the correct wind speed ranges for the tables specified by the equipment maker's software. The embodiments of the present invention also solve this problem.

In a preferred embodiment of the invention, the user has three different kinds of fine tune settings, namely upwind angle, downwind angle and wind speed. The correction algorithm discussed here allows for the user to input simple numerical corrections based on tack-to-tack deviations in wind direction. The adjustments are made automatically to the appropriate parameters without the user becoming involved with the details.

In the algorithm are two wind angle correction tables (upwind angle and downwind angle) and one correction percentage for wind speed. The wind speed correction is applied to the downwind speed (the upwind speed in not corrected, as the measured value is typically correct) and is a simple fixed percentage correction based on wind speed error observed from upwind to downwind or vice versa. Whilst wind speed could be corrected like the angle in a piecewise linear manner, this is not necessary or done according to a preferred embodiment. The two TWA correction tables are piecewise linear with 3 points, 5 knots, 15 knots and 25 knots. Above 25 knots, the correction is held at the 25 knots value, and below 5 knots at the 5 knot value.

Figure 8:
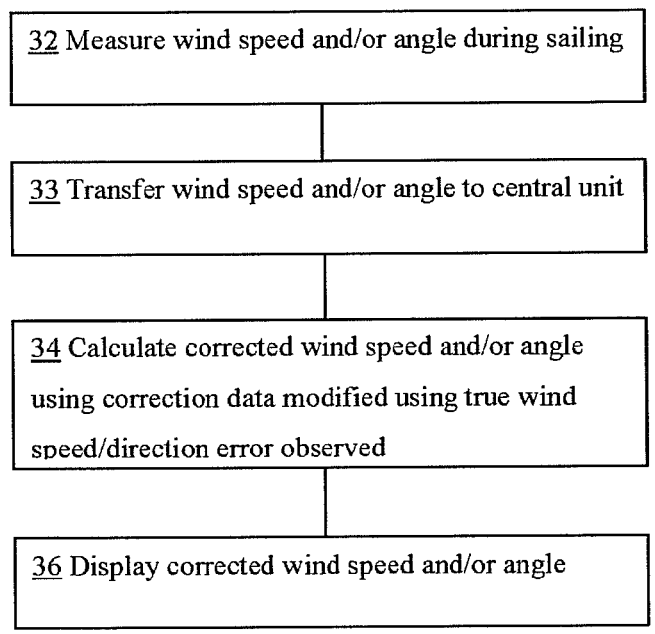
FIG. 8 shows as a flow chart a method according to one preferred embodiment of the present invention.

If the TWS is 12 knots, for example, (like the black dots in FIG. 7), when the calibration tack-to-tack measurement is carried out, then it is part way between the 5 and 15 knot points, so 15 knot and the 5 knot points are both moved according the formula indicated in FIG. 8, where "adjustment" is the half the value entered by the user and y1 and y2 are the resulting adjustments made to the 5 and 15 knots points.

The user can make any number of incremental adjustments at any wind speeds, but typically if he or she makes a single adjustment in light winds, medium winds and strong winds then this is sufficient to fully calibrate the tables. For a piecewise linear initial correction data with three key points (like in FIG. 7), the minimum number of incremental adjustments is two (one between 5 and 15 knots and one between 15 and 25 knots).

Figure 10:
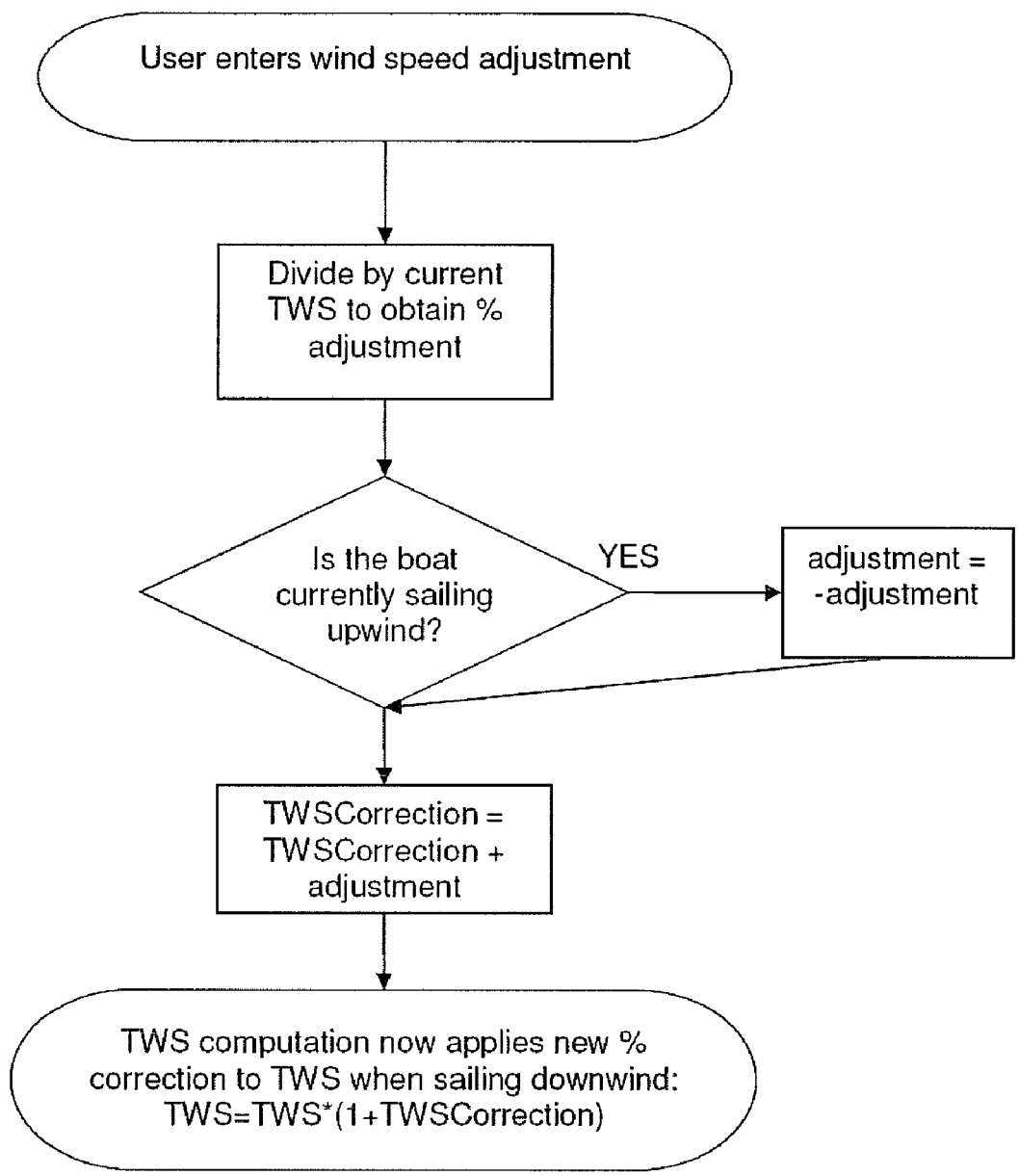
FIG. 10 shows a wind speed correction algorithm as a flow chart according to one preferred embodiment of the present invention.

The TWA calculation is preferably made by utilizing TWS which can, for its part, be calculated using the algorithm shown in FIG. 10, for example.

The wind direction error may be obtained through user input means, such as a keyboard or other user interface members. The computing unit is adapted to store, optionally pre-process, and use the input data. The input means is functionally connected with program means which is adapted to query and utilize the wind direction error from the user. Once an error value has been entered, the program means process the error value according to the principles herein described.

Alternatively or in addition to that, the device may comprise means for automatic determination of boat-specific correction data to be used for performing the correction. This determination is preferably based on a plurality of tacking cycles such that the change in corrected wind direction is as small as possible during the cycles. The automatic selection can be arranged to be selected by the user as an additional setting in addition to manual boat-specific settings.

Thus, user-made fine tuning could be eliminated completely via an "automatic" setting in which an intelligent algorithm monitors and adjusts the following parameters:

1. Wind direction is monitored, and tack events are detected. The assumption is made that the wind on average does not shift during a tack. Therefore if the measured wind direction is consistently greater on port tack than on starboard, then a measurement error in the AWA is inferred and the TWA is corrected accordingly. The corrected TWA is optimized when the wind direction (=heading+corrected TWA) is invariant from tack to tack.

2. Wind speed is monitored and upwind/downwind events are detected. The assumption is made that the wind on average does not become stronger or weaker because the boat has turned a mark of the course. Therefore if the TRUE wind is consistently stronger upwind than downwind, then a measurement error is assumed in the downwind readings and is corrected accordingly. The corrected TWS is optimised when the TWS is invariant upwind and downwind.

One embodiment for performing the correction after having the boat-specific wind direction error values utilized according to the process described above, for example, is shown in simplified manner in FIG. 8. In step 32, the AWS and AWA are measured during sailing using an external sensor or sensors. In step 33, the AWS and AWA readings are transferred to the central unit. In the central unit, in step 34, the AWS and AWA readings are corrected to TWS and TWA (and further TWD) using corresponding algorithms. When the correction has been performed, the TWS and TWD readings are displayed to the user in step 36.

Needless to say, the modified correction data has to be generated only once for each boat, after which it can be used for correcting the wind condition readings several times.

The apparent wind speed and angle readings and boat heading and speed readings can be obtained by methods and apparatuses known in the art per se.

EXAMPLE

Upwind Angle adjustment (modifies the upwind angle correction data)—Whilst tacking upwind, if the wind direction on the current tack is seen to be ten degrees high, enter an adjustment value of −10. If low, enter a + adjustment.

Downwind Angle correction (modifies the downwind angle correction data). Whilst jibing downwind, if the wind direction on the current jibe is seen to be ten degrees high, enter an adjustment value of −10. If low, apply a + adjustment. After the entering the adjustment value(s), respective modification(s) to respective wind angle correction curves are applied at respective speed bands.

Wind Speed correction (modifies wind speed correction data)—Modifies the wind speed correction to balance readings upwind and downwind.

After turning from upwind to downwind, or downwind to upwind, if the wind speed is now seen to be reading 1.5 knots high, enter an adjustment value of −1.5. If low, enter a + adjustment.

While the preferred embodiments of the present invention have been described and illustrated, numerous departures therefrom can be contemplated by persons skilled in the art. Therefore, the present invention is not limited to the foregoing description but only by the scope and spirit of the appended claims. The claims should be interpreted in their full scope taking equivalents into account.

What is claimed is:

1. A device for determining wind conditions around a sailboat, the device comprising:
 means for receiving a measured wind angle and wind speed readings from a wind sensor attached to the sailboat;
 means for receiving readings of boat heading and boat speed through the water;
 means for storing wind angle correction data;
 a computing unit for computing a corrected wind angle reading using the measured wind angle reading, the boat speed reading and the wind angle correction data, and for computing a wind direction using the corrected wind angle reading and the boat heading reading;
 means for displaying or outputting the wind direction;
 input means for receiving a wind direction error tack to tack from the user or means for automatically determining this error;
 means for determining the current tack state of the sailboat using the measured wind angle reading; and
 means for modifying the wind angle correction data based on said wind direction error and the current tack state information.

2. The device according to claim 1, wherein the device is adapted to receive or determine wind direction errors for upwind and downwind sailing angles separately and to modify the wind angle correction data accordingly.

3. The device according to claim 1, wherein the device is adapted to receive the wind direction error values from the user in degree format and, optionally, dividing the correction parameter by two for allowing the user to directly input a wind direction error observed during a tack-to-tack change.

4. The device according to claim 2, wherein the device is adapted to receive the wind direction error values from the user in degree format and, optionally, dividing the correction parameter by two for allowing the user to directly input a wind direction error observed during a tack-to-tack change.

5. The device according to claim 1, wherein the wind angle correction data comprises a correction function comprising at least one of a discrete function, a piecewise linear function, one or more continuous mathematical functions or a combination thereof.

6. The device according to claim 1, wherein the wind angle correction data comprises separate correction data for a plurality of different wind speeds, and wherein the device is adapted to utilize the measured wind speed reading for modifying the wind angle correction data at or in the vicinity of the current wind speed measured using the wind sensor.

7. The device according to claim 1, wherein the initial wind angle correction data is statistically formed from correction data for a plurality of individual sailboats such that the data represent a plurality of sailboats.

8. The device according to claim 5, wherein the wind angle correction data comprises a piecewise linear correction function defined by at least two key points at different wind speeds and wherein the computing unit is adapted to modify the piecewise linear function based on the wind direction error and information on wind speed the wind angle correction parameter is related to.

9. The device according to claim 6, wherein the wind angle correction data comprises a piecewise linear correction function defined by at least two key points at different wind speeds and wherein the computing unit is adapted to modify the piecewise linear function based on said wind direction error and information on wind speed the wind angle correction parameter is related to.

10. The device according to claim 7, wherein the wind angle correction data comprises a piecewise linear correction function defined by at least two key points at different wind speeds and wherein the computing unit is adapted to modify the piecewise linear function based on said wind direction error and information on wind speed the wind angle correction parameter is related to.

11. The device according to claim 1, wherein the computing unit comprises means for determining whether the sailboat is on port or starboard tack, and is adapted to determine, based on the tack, the sign of modification of the wind condition correction data.

12. The device according to claim 1, further comprising means for automatically determining the wind direction error based on deviations in wind direction computed during one or more tack-to-tack changes.

13. The device according to claim 1, wherein the device is adapted to receive from the user, or to automatically determine, a wind speed error observed when changing from upwind to downwind or vice versa, and wherein the device is adapted to correct the measured wind speed using the wind speed error.

14. A method of determining wind conditions around a sailboat during sailing with onboard instrumentation, the method comprising:
measuring wind angle and wind speed using an onboard sensor for obtaining a measured wind angle reading and a wind speed reading;
measuring boat heading and speed through the water for obtaining a boat heading reading and boat speed reading;
correcting the wind angle reading for measurement errors using an onboard computing unit using the measured wind angle reading, the boat speed reading and wind angle correction data stored in the onboard instrumentation for obtaining a corrected wind angle reading;
computing a wind direction using the corrected wind angle reading and the boat heading reading;
receiving from a user, or automatically determining, a wind direction error tack to tack;
determining, using on the wind angle reading, the current tack state of the sailboat;
modifying said wind angle correction data based on said wind direction error and said current tack state information; and
computing subsequent wind directions using said modified wind angle correction data.

15. The method according to claim 14, further comprising the steps of:
receiving the wind direction error from the user in signed degree format;
dividing the correction parameter by two for allowing the user to input wind angle deviation observed during a tack-to-tack change as said wind direction error; and
increasing or decreasing correction values in the wind angle correction data using the divided correction parameter.

16. The method according to claim 14, wherein the wind angle correction data comprises separate correction data for a plurality of different wind speeds, by utilizing the measured wind speed reading for modifying the wind angle correction data at on in the vicinity of the current wind speed.

17. The method according to claim 14, further comprising the steps of:
utilizing initial wind angle correction data, which is statistically formed from correction data for a plurality of individual sailboats such that the data represent a plurality of sailboats, the initial correction data being preferably averaged over the correction data for a plurality of individual sailboats; and
modifying said initial wind angle correction data using the wind direction error and tack state information for obtaining boat-specific wind angle correction data.

18. The method according to claim 14, further comprising the steps of:
utilizing wind angle correction data comprising a piecewise linear correction function defined by at least two key points at different wind speeds; and
modifying the piecewise linear function based on said wind direction error and information on wind speed the wind angle correction parameter is related to.

19. The method according to claim 14, further comprising the steps of:
utilizing wind angle correction data comprising a piecewise linear correction function defined by at least two, preferably three or more key points at different wind speeds, and
modifying the piecewise linear function based on said wind direction error and information on wind speed the wind angle correction parameter is related to.

20. The method according to claim 14, further comprising the steps of:
receiving from the user, or automatically determining, a wind speed error observed when changing from upwind to downwind;
determining whether the boat is sailing upwind or downwind; and
correcting the measured wind speed reading using said wind speed error and information on the sailing direction for obtaining a corrected wind speed reading.

* * * * *